(12) United States Patent
Brown et al.

(10) Patent No.: US 10,704,123 B2
(45) Date of Patent: Jul. 7, 2020

(54) PROCESS FOR THE SEPARATION AND PURIFICATION OF MEDICAL ISOTOPES

(71) Applicant: UCHICAGO ARGONNE, LLC, Chicago, IL (US)

(72) Inventors: Michael Alexander Brown, Chicago, IL (US); Jerry A. Nolen, Jr., Chicago, IL (US); David Alan Rotsch, Montgomery, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 16/502,922

(22) Filed: Jul. 3, 2019

(65) Prior Publication Data

US 2019/0338394 A1 Nov. 7, 2019

Related U.S. Application Data

(63) Continuation-in-part of application No. 15/243,002, filed on Aug. 22, 2016, now Pat. No. 10,344,355.

(51) Int. Cl.
*C22B 60/02* (2006.01)
(52) U.S. Cl.
CPC .................. *C22B 60/0295* (2013.01)
(58) Field of Classification Search
CPC .................. C22B 59/00; G21F 9/00
See application file for complete search history.

(56) References Cited

U.S. PATENT DOCUMENTS

| | | | |
|---|---|---|---|
| 2,759,792 A * | 8/1956 | Lister | C01G 25/003 423/70 |
| 5,154,897 A | 10/1992 | Ehrhardt et al. | |
| 5,409,677 A | 4/1995 | Zinn | |
| 9,056,142 B2 | 6/2015 | Karlson et al. | |
| 2003/0194364 A1 | 10/2003 | Bond et al. | |
| 2004/0062695 A1 | 4/2004 | Horwitz et al. | |

FOREIGN PATENT DOCUMENTS

WO WO2015173098 11/2015

OTHER PUBLICATIONS

B. Bartos, et al., "New separation method of no-carrier-added 47 Sc form titanium targets," Radiochim. Acta 100, 2012, pp. 457-461.
M. Mamtimin, et al. "Sc-47 production from titanium targets using electron linacs," Applied Radiation and Isotopes 102, 2015, pp. 1-4.
(Continued)

*Primary Examiner* — Melissa S Swain
(74) *Attorney, Agent, or Firm* — Cherskov Flaynik & Gurda, LLC

(57) ABSTRACT

The invention provides a method for isolating medical isotopes, the method having the steps of dissolving titanium nuclear targets to create a solution; contacting the solution with a resin so as to retain the isotopes on the resin and generate an eluent containing titanium; contacting the isotope-containing resin with acid of a first concentration to remove impurities from the resin; and contacting the isotope-containing resin with an acid of a second concentration to remove isotope from the resin.

20 Claims, 2 Drawing Sheets

(56) References Cited

OTHER PUBLICATIONS

S. Srivastava, "Paving the Way to Personalized Medicine: Production of Some Promising Theragnostic Radionuclides at Brookhaven National Laboratory," Seminars in Nuclear Medicine, 2012, pp. 151-163.
T. Braun, G. Ghersini, Extraction Chromatography, Elsevier, New York, 1975, p. 102-104.
F.W.E. Strelow, C.J.C. Bothma, Anion Exchange and a Selectivity Scale for Elements in Sulfuric Acid Media With a Strongly Basic Resin, Analytical Chemistry, 1967,39, p. 595-599.
J.P. Faris, J.W. Warton, Anion Exchange Resin Separation of the Rare Earths, yttrium, and Scandium in Nitric Acid-Methanol Mixtures, Analytical Chemistry, 1962,34, 1077-1080.
V. Gopalakrishnan et al, Extraction and Extraction of Chromatographic Separation of Minor Actinides From Sulphate Bearing High Level Waste Solutions Using CMPO, J. Radioanal Nucl. Chem., 1995, 191, 279-289.
R.G. deCarvalho and G.R. Choppin, Lanthanide and Actinide Sulfate Complexes—I: Determination of Stability Constants J. Inorg. Nucl. Chem., 29, 1967, 725-735.

* cited by examiner

PROCESS FOR THE SEPARATION AND PURIFICATION OF MEDICAL ISOTOPES

PRIORITY

This Utility patent application claims priority benefit as a Continuation In Part of U.S. Non-Provisional patent application Ser. No. 15/243,002, filed on Aug. 22, 2016, and which issued on Jul. 9, 2019 as U.S. Pat. No. 10,344,355 B2, the entirety of which is incorporated by reference.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to medical isotopes and more specifically, this invention relates to the isolation and purification of medical radioisotopes from irradiated targets.

2. Background of the Invention

Radioisotopes play important roles in numerous areas ranging from medical treatments to national security and basic research. Some examples include investigations of structures and reactions involving atomic nuclei, Mossbauer spectroscopy, radio-thermoelectric generation and other nuclear batteries, nuclear device detection, nuclear non-proliferation, cancer diagnosis and therapies.

Radionuclide production technology for medical applications has been pursued since the early 1900s both commercially and in nuclear science centers. The ionizing nature of the emissions of certain radioactive isotopes can be used to destroy malignant biological tissues. The unpredictable and fast-acting properties of tumors and infectious diseases demand that radionuclide therapies employ a wide arsenal of radioisotopes of differing radioactive emissions. Many medical radioisotopes are now in routine production and are used in day-to-day medical procedures, with production centers currently seeking FDA approval for additional radio-isotopes. Despite these advancements, research is accelerating around the world to improve the existing production methodologies as well as to develop novel radionuclides for new medical applications.

For more than 40 years, the National Nuclear Security Administration (NNSA) has targeted the conversion of world-wide research reactors from highly-enriched uranium (HEU) to low-enriched uranium. This is problematic inasmuch as these HEU reactors are a pivotal source of medical radioisotopes such that the conversion of these reactors may curtail isotope availability. Although high specific activity (HSA) radioisotopes are important in nearly all aspects of radiochemical work, most radionuclides produced in nuclear reactors have low specific activity due to the inherently limited production reaction pathways, (n, $\gamma$) that only change the mass number and not the atomic number and thus not the identity of the element. Specific activity refers to the radioactivity of a given radioisotope per unit mass, usually per mass of the ground state of the element of interest present in the sample.

In order to achieve HSA radioisotopes, the product of nuclear reactions must be chemically different and separable from the target material. These are the keys to producing HSA radioisotopes. In the medical sense, HSA radioisotopes are essential for radioisotope therapy or radioimmunotherapies (RIT). Here HSA radioisotopes are bound to specific sites that are coordinated to targeting vectors that seek markers expressed on/in cancer tissues. Low specific activity radioisotopes will not work for these applications as the nonradioactive target material (or non-useful isotope) will compete for the binding site meant for the radioisotope. Fewer agents with the desired cancer fighting payload (radioisotope) make it to the cancer site, thus decreasing the effectiveness of the therapy.

Separation of desired radioisotope from the target material is of paramount importance for medical applications as well as for radiological source preparation, and nuclear fuel reprocessing. Technologies described herein for the chemical separation of radioisotopes from target materials can also be useful for industrial applications such as the isolation of pure products from ores and mineral deposits and vica versa.

Radionuclides with ionizing beta emissions, several day half-lives, and appropriate gamma emissions are potential candidates for radioimmunotherapy. Scandium-47 is an emerging combined therapeutic and diagnostic (theragnostic) medical isotope that can be used for targeted radionuclide therapies in the treatment of a variety of tumors and rheumatoid arthritis. Sc-47 is $\beta$ emitter of moderate radiation energies (max. 439 and 600 keV) with a 3.35 day half-life. In addition, Sc-47 emits $\gamma$-ray of 159 keV, which is suitable for Single Photon Emission Computed Tomography (SPECT).

Methods researched for the production of high-specific activity Sc-47 include nuclear activation of enriched titanium targets by fast-neutron reactors, high-energy proton accelerators, or electron accelerators. Carrier free (HSA) Sc-47 can be produced in a nuclear reaction either from Ti-47 (n,p) or from Ca-46 (n,$\gamma$).

State of the art scandium isolation and purification protocols require complex and time-consuming separation avenues. Lengthy steps with columns and metal complexing agents are often required. Multiple solvent extraction steps using multiple ion exchange columns are employed in state of the art methods.

Also, these processes are long, in excess of 8-12 hours. These long processing times are particularly troublesome inasmuch as the desired radio-isotope is decaying with time and therefore lost over extending processing times.

Given these shortcomings in scandium isolation and purification protocols, the availability of scandium is potentially very expensive and uncertain. Therefore, while Sc-47 has very desirable half-life of 3.35 days, the medical community is forced to use less viable alternatives.

A need exists in the art for a system and method for economically isolating and purifying Sc-47. The system and method should integrate several element harvesting procedures in as few steps as possible and omit excessively hazardous or complex reagents so as to render product as quickly as possible. Furthermore, the system and method should eliminate or at least minimize secondary waste streams, and provide the option of recycling the target material.

SUMMARY OF INVENTION

An object of the invention is to provide a process and a system to isolate and purify medical grade isotopes that overcomes many of the drawbacks of the prior art. The invention can facilitate the separation of any divalent cations (e.g., the alkaline earths such as Ca(II), Sr(II) Ba(II), and Ra(II)) and trivalent cations (e.g., Y-90, the lanthanides, Lu-177, Sm-153, Er-169, Tb-161, Gd-159, Pr-143, Pm-149, Dr-165, Ho-166, Pr-142, Ac-225,), and Group 4 elements Ti, Zr, Hf, Th, from other materials.

Another object of the invention is to provide a process and system for isolating and purifying isotopes from irradiated titanium targets. A feature of the invention is that a single resin bed is utilized to isolate and purify the isotopes, whereby only sulfuric acid is required as the vehicle to transport and adsorb the isotopes to the resin. An advantage of the invention is that radiopharmaceutically pure (e.g. greater than about 95 percent) isotope is generated in less than 3 hours.

Still another object of the present invention is to provide a process for isolating and purifying carrier free isotopes such that no additional agents need be added to aid in isolation and purification. A feature of the invention is that sulfuric acid is utilized in the separation step of the protocol. An advantage of the process is that no evaporations or multiple complexing agents are required, thereby streamlining the process.

Briefly, the invention provides a method for isolating isotopes from homogeneous or heterogeneous bulk material, the method comprising dissolving the material in sulfuric acid to create a solution; contacting the solution with a resin so as to retain isotopes on the resin and generate an eluent containing titanium; contacting the isotope-containing resin with acid of a first concentration to remove impurities (e.g., iron, aluminum, any residual titanium and other ions) from the resin; and contacting the isotope-containing resin with an acid of a second concentration to remove purified isotope from the resin.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
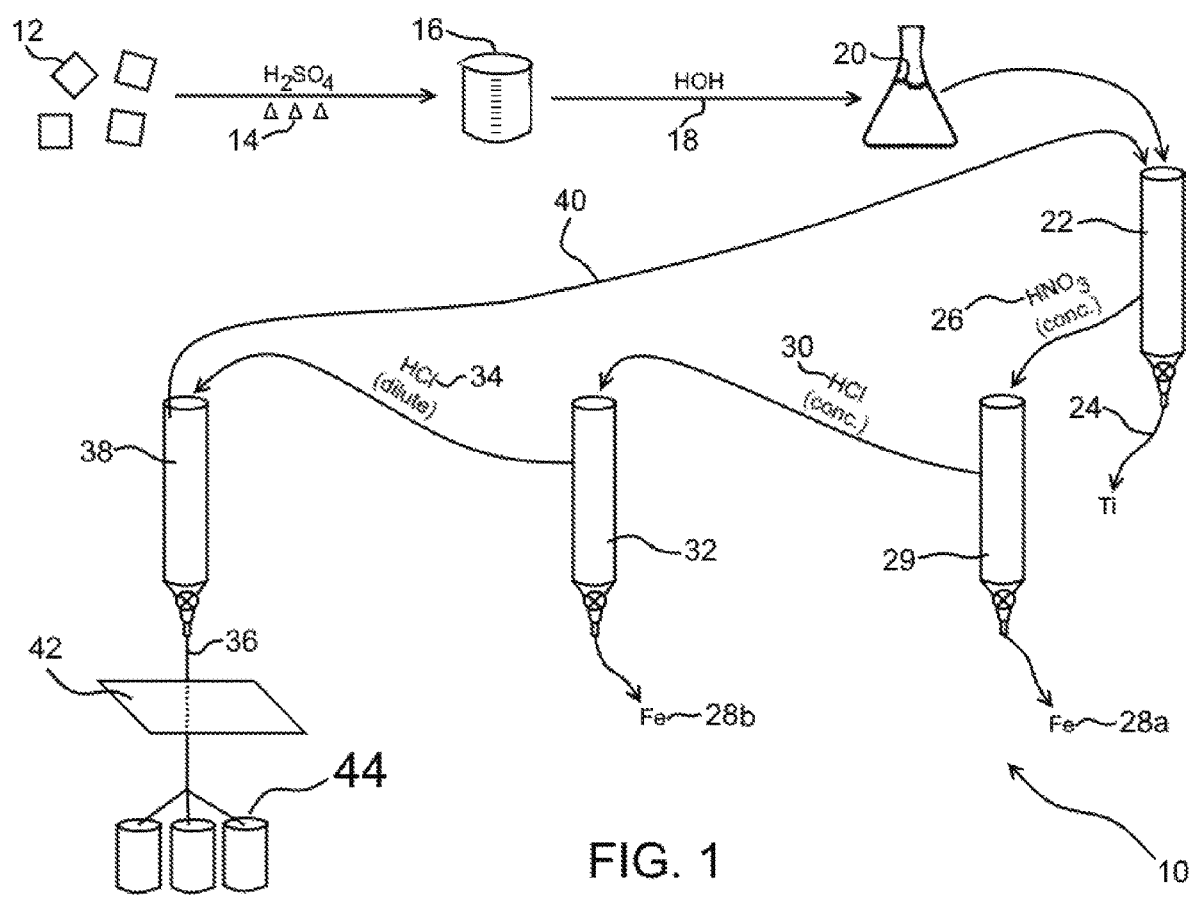
FIG. 1 depicts a flow chart of scandium isolation and purification, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one skilled in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a method and system for isolating and purifying +2, +3, and +4 oxidation state moieties from other materials. For example, the invention provides a facile method for isolating and purifying hard trivalent oxidation state moieties, including, but not limited to Sc-47, Lu-177, Y-90, and Ac-225. ("Hard" ions have small ionic radii and large positive ionic charges.)

A salient feature of the invention is loading separation resins with a liquid phase mixture of isotopes, wherein in the liquid phase contains bisulfate and/or sulfate anions. Any amount of bisulfate (including but not limited to ammonium sulfate or alkali sulfates) facilitates loading. As such, suitable cations in the sulfate and bisulfate salts are sodium, potassium, rubidium, and cesium. For example, concentrations of between about 0 to about 2.5 M sodium bisulfate are suitable. These concentrations can also be used for the other alkali metal cations listed herein.

Embodiments of the invention include solely sulfuric acid as the dissolution agent in the isotope liquid phase. Other embodiments include mixtures of sulfuric acid with other acids (such as: hydrofluoric acid/sulfuric acid, nitric acid/sulfuric acid, hydrochloric acid/sulfuric acid, etc.) in the isotope liquor. Generally, the sulfuric is the primary component of any acid mixture. For example, the sulfuric acid is in excess to the hydrofluoric acid.

That hydrofluoric acid can be used in the invented resin system is counterintuitive inasmuch as the acid's strong anion stymies DGA complexing with the target radioisotopes. However, surprisingly and unexpectedly, the inventors found that sulfate anions, and particularly bisulfate anions, facilitate adsorption of target radioisotopes (e.g., Sc-47) to resins, whether the anions are combined with other mineral acids or presented neat as $H_2SO_4$. As such, HF can be used to readily dissolve the target and the sulfate and/or bisulfate can be used to aid in the retention of the isotope to the resin. The limiting reagent in this complexation is the bisulfate.

The final product of the invention is a high purity (above 95 percent) yield of radioisotopes for medical and other applications. Purity relates to the specific activity. High specific activity is extremely important in chelation chemistry, discussed below in relation to the production of medical isotopes.

Radioisotopes produced via the invention are in pico- and nano-gram quantities. Therefore, chelators are generally in great excess compared to the radioisotope and any impurities in the process eluent. After chelation, a targeting vector (e.g., an antibody specific for a cancer) is complexed with the chelated radioisotope. If there are any impurities, the chelator may bind those impurities and the drug will be less effective. Furthermore, if there are impurities, the impurities will compete for the binding sites and thus not all of the radioactive (or useful) component will be utilized. The presence of other radioisotopes can also introduce radiation uncertainties which could reduce the quality of gamma images, diminish the accuracy of therapeutic ionizations, or provide unnecessary additional radiation dose to the patient and medical staff.

An embodiment of the invention provides a method and system for isolating medical radioisotopes from irradiated feedstock. One such radioisotope is scandium 47. Scandium has a hard trivalent (+3) oxidation state. This provides an important chelation advantage. The chelated construct is combined with antibodies for targeted application to neoplasms and other cancerous tissues. It also has desirable radiations, e.g., beta and gamma emissions, for therapy and diagnositics, respectively.

Recently, electron linacs have become capable of producing photons with sufficient energy and flux for radioisotope production. The electron linac may provide a cheaper method, than nuclear reactors, for producing radioisotopes with higher specific activity and increased yields.

FIG. 1 depicts a method, designated as numeral 10, for isolating and purifying medical radioisotopes from activated targets. These targets are generally homogeneous and heterogeneous bulk material such as elemental metal or metal alloy, metal oxide cladding, ore, etc., that have been irradiated. The targets may also be mixtures of solid and liquid phases. The targets are "activated" when nuclear radiation treatment produces the radioisotopes of interest within the target. For example, the targets are first subjected to irradiation from photons (converted electrons) and electrons produced from electron accelerators to generate trivalent and divalent moieties such as Sc-47, Lu-177, Y-90, Ac-225, and other medically relevant radioisotopes.

In the case of Sc-47 production, Ti-48 is bombarded with photons produced from electrons striking a convertor. The photon ejects a neutron from the titanium atom, thereby transmuting the higher weight titanium into the lower weight Sc-47. Then, the titanium-oxide targets 12 are contacted with an acid 14, which is preferably heated to above 70° C. but below the boiling point of water or about 100° C., so as to dissolve. This solubilizes 16 the nuclear products within those targets. Water 18 is added to decrease the viscosity of the solution, thereby creating a relatively more free-flowing solution 20. Notwithstanding, the initial loading of the resin is with a liquid phase of about 5 M or higher in acid concentration (e.g., about −0.5 to about −1 pH).

This free flowing solution 20 is preferable in facilitating the next step which is permeating a resin 22 with the solution so as to begin the separation process. The resin may be confined as in a column, or free flowing. The analyte of interest is retained on the column such that the diluent 24 comprises mainly titanium. In an embodiment of the invention, a single cation exchange resin column or bed is utilized throughout the process.

In an embodiment of the invention, a salient feature to this part of the protocol is that only sulfuric acid is used as the loading acid (i.e., the carrier vehicle for transporting and adsorbing the targeted isotope to the resin). Surprisingly and unexpectedly, the inventors found that sulfuric acid synergizes the trapping (adsorption) of target radioisotopes onto DGA resins. Overall, this simplifies the overall process and purification chemistry downstream. Notwithstanding the foregoing, sulfates and/or bisulfates may be added simultaneously or serially with the sulfuric acid loading step. For example 1 M Sulfuric acid may be mixed with 2 M sodium bisulfate to produce a solution with total sulfate ion concentration of 3 M. Total sulfate concentrations can vary between 1 and 10 M, preferably between 2 and 7 M, and most preferably between 3 and 6 M. Typical sulfate concentrations utilized by the inventors are between 4 and 5 M.

The resin is then subjected to nitric acid 26 of between about 5 and about 8 M) so as to begin extraction of impurities 28a (e.g., iron, aluminum, alloys, etc.) from the scandium-containing resin. A second impurity-releasing wash is utilized using mild (about 5 M to about 8 M) hydrochloric acid 30. This creates a second impurities-ladened diluent 28b and removes any residual nitric acid remaining from the first wash. However, if the final product is desirable in $HNO_3$, no HCl wash is required. Rather, a second wash using dilute $HNO_3$ (0.1 M) can be utilized after the initial 5-8 M $HNO_3$ wash.

Impurities are washed away in the following order: The resin is first loaded with $H_2SO_4$ to remove extra Titanium, the resin is then permeated with $HNO_3$ to remove iron and other impurities the resin and HCl is then added to the resin to remove the $HNO_3$ to get the resin media into HCl form so that the final product is solely in HCl, in those instances where the isotope is to be supplied in HCl.

The now heavily scandium-ladened resin 32 is permeated with relatively dilute acid 34 (such as 0.1 M hydrochloric acid) to generate diluent comprising mainly solubilized scandium 36. This renders the resulting resin 38 suitable for recycling 40. Optionally, the resin is regenerated with sulfuric acid (e.g., at about a 4 to about 10 M, and preferably from about 5 to about 7 M concentration) before recycling back to the beginning of the process.

The resulting, eluted scandium 36 is subjected to filtration 42 such as by contacting the eluted scandium 36 with a sterile filter to provide pure (e.g., greater than 95 percent) scandium 47 diluent 44.

A salient feature of the invented process and system is the use of titanium as the target, sulfate-rich sulfuric acid to solubilize the scandium, and DGA for purifying the scandium.

Another salient feature of the invented method and system is the use of diglycolamide based resins, (e.g., N,N,N',N'-tetra-n-octyldiglycolamide (DGA Resin, Normal) or N,N,N',N'-tetrakis-2-éthylhexyldiglycolamide (DGA Resin, Branched)), such as those commercially available from Eichrom Technologies (Lisle, Ill.). In an embodiment of the invention, the resin comprises a diglycoamide having the following structural formula:

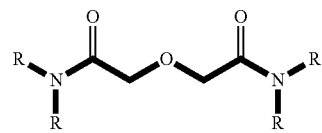

wherein R is an alkyl selected from the group consisting of normal or branched derivatives of DGA and combinations thereof. The resin works by solvating cations with an inorganic counter-ion in the solubilized titanium liquor.

Concentrations of the acid extracting vehicles will vary at various steps of the process. For example, the titanium target solubilization step 14 requires sulfuric acids at concentration above about 2 M, and preferably between about 4 M and about 8 M. It is noteworthy that the titanium removal steps require only sulfuric acid (and not other mineral acid solutions, for example nitric acid). This single acid paradigm for titanium solubilization and removal minimizes the overall time and effort for processing the scandium. However, mixtures of sulfuric acid and other acids also can be used. For example, hydrofluoric acid can be used to dissolve the titanium target to create a solution. Then, the titanium-containing hydrofluoric acid solution is diluted with sulfuric acid to facilitate loading of the resin. Alternatively, the column can be loaded with titanium-containing hydrofluoric acid which is first diluted with another mineral acid of 5 M concentration or higher. (Such mineral acid being HCl or $HNO_3$.) Surprisingly, and unexpectedly, the inventors found that resin sorption of the isotopes of interest is more efficient in at least acidic conditions (e.g., approximately greater or equal to 5 M acid concentrations).

Similarly, the impurity extraction steps 28a, 28b, post-titanium removal, require relatively concentrated nitric acid (e.g., above about 3 M and below about 8 M) and hydrochloric acid (e.g., above about 3 M and below about 8 M), respectively.

No evaporations or multiple resin beds are required to perform the invented method and system. Aside from the initial heating of the titanium dissolving sulfuric acid, the process can be done at any temperature and pressure. For example, temperatures between 0 C and 100 C are acceptable.

As for pressures, ambient, negative or positive pressures are also acceptable. Generally, pressures between about 10 mTorr to about 6000 Torr are used. For example, pressure can be applied to the resin as a force flow method, whereby the loaded solution is forced through the resin. Alternatively, a negative pressure is applied to the resin at its downstream end so as to pull the load solution through.

In summary, the invented process comprises:
irradiating a sample so as to transmute portions of that sample to a target isotope;
dissolving the sample so as to create a liquid containing the target isotope;
purifying the isotope by contacting the liquid to an ion exchange media;
recycling the exchange media; and
repeating the process.

Example

Titanium dioxide was combined with sulfuric acid and ammonium sulfate such that approximately 10 times more ammonium sulfate by weight was present than the titanium dioxide. (The sulfate expedites dissolution of titanium dioxide.) This entire mixture was heated for about 1 to about 2 hours at above 70° C.

After dissolution, the solubilized target mixture is permeated through a DGA column. Preferably, the mixture is first cooled to allow direct handling, e.g., to below approximately 70° C. This permeation results in the targeted isotope (e.g., Sc-47) to be retained by the column while the titanium is washed out as eluent.

Any additional titanium is removed from the resin via a 5 M sulfuric acid wash of the same resin bed.

The resin bed is then stripped of any other impurities by washing it with nitric acid and or hydrochloric acid. Concentrations of these acids can be above about 3 M and below about 10 M. As little as about 5-10 milliliters (mL) of wash solution will facilitate impurities removal.

Approximately 0.1M HCl is utilized to dislodge the scandium-47 from the finally washed resin. Optionally, the eluent is subjected to filtering. For example, 5 micron sterile syringe filters are suitable.

Sulfuric acid solutions were prepared over a concentration range of 2-8 M from reagent-grade concentrated sulfuric acid and deionized water. Hydrochloric acid solutions were prepared over a concentration range of 0.05-1.5 M from reagent-grade concentrated hydrochloric acid and deionized water. Hydrofluoric acid solutions were prepared over a concentration range of 0.1-28 M from optima-grade hydrofluoric acid $H_2SO_4$—HF solutions were prepared over a hydrofluoric acid concentration range of 0.1-28 M (5 M $H_2SO_4$ with varying concentrations of HF) from reagent-grade sulfuric acid, optima-grade hydrofluoric acid, and deionized water.

The prepared acid solutions were titrated with 1.0 N sodium hydroxide solution. The $^{46}Sc$ solution (used as a long-lived tracer for reduction to practice) was prepared in-house and had an activity range of 6,030-6,480 cpm. The stable scandium stock solution was obtained from 10,000 µg/mL scandium in dilute nitric acid standard reference material solution. The titanium stock solution was obtained from 10,018±46 µg/mL titanium in 0.5% (v/v) $HNO_3$/trace HF standard reference material solution. The yttrium-88 stock solution was prepared from dilution of a 50 mg/mL $YCl_3H_2O$ in 0.1 M HCl solution and had an activity range of 22,000-26,500 cpm.

The batch method was utilized at standard temperature and pressure (25° C., 1 atm) to assess the potential performance of titanium, yttrium, and scandium on a chromatography column. While $^{47}Sc$ is the isotope of interest for medical applications, the batch study portion of this investigation was conducted using the $^{46}Sc$ radioisotope ($E_{\gamma_1}$=1.12 MeV, $E_{\gamma_2}$=0.889 MeV, $t_{1/2}$=83 days) because it has a longer half-life than $^{47}Sc$, making its supply more reliable. The $^{88}Y$ radioisotope ($E_\gamma$=1.060 MeV, $t_{1/2}$=103.6 days) was also used as a homolog in this study for its easily-detected radioactive decay mode and its commercial availability. Activities for both the $^{46}Sc$ and $^{88}Y$ studies were separately determined with a NaI gamma-ray spectrometer.

Each element was treated with its own batch study. In the investigation, a small amount of resin (0.1 g for $^{nat}Ti$, 0.01 g for $^{nat}Sc$, $^{46}Sc$, and $^{88}Y$) was added to a clean 15 mL polypropylene centrifuge tube using an analytical balance for each acid concentration studied (in triplicate). An aliquot of prepared acid solution (2 mL for $^{nat}Ti$ and 1 mL for $^{nat}Sc$, $^{46}Sc$, and $^{88}Y$) and 100 µL of element stock solution were added. Additionally, an aliquot of acid solution and 100 µL of elemental stock solution were added to a clean 15 mL centrifuge tube as a laboratory control (sans resin), and an aliquot of acid was added to a clean scintillation vial to obtain background concentrations and activities.

For each acid concentration (2-8 M $H_2SO_4$ in 1 M increments, 0.05-1.5 M HCl in 0.1 M increments, 0.1-28 M HF over the [0.1, 1, 7.2, 14.4, 28.8] M range, and 5 M $H_2SO_4$—HF for HF concentrations of [0.1, 1, 2, 5, 10] M), these five samples were prepared and placed on a gyratory shaker (New Brunswick Scientific Co., Inc., Model G2) operating at 350 rpm to allow for sorption of the elements onto the resin. After one hour of shaking, each sample was extracted from the centrifuge tube with a sterile 3 mL syringe/needle combination (BD Medical). The needle was removed and a 0.2 µm 13 mm PTFE syringe filter (Whatman, Pall Gelman Acrodisc) was affixed to the syringe boor.

The solution was forced through the filter into either a clean 15 mL centrifuge tube ($^{nat}$Ti, $^{nat}$SC) or a clean scintillation vial ($^{46}$Sc, $^{88}$Y).

Samples containing titanium and cold scandium were submitted to the Argonne Analytical Chemistry Laboratory for ICP-MS analysis for titanium and scandium concentrations. Samples containing radioactive scandium and yttrium were counted using NaI scintillation gamma-ray spectroscopy for three hours for $^{46}$Sc in $H_2SO_4$ solutions, ten minutes for $^{46}$Sc in HCl solutions, five hours for $^{88}$Y in $H_2SO_4$ solutions, and sixty seconds for $^{88}$Y in HCl solutions.

The results obtained for the uptake of $^{46}$Sc on the resin in $H_2SO_4$ solutions are summarized in Table I. One indication of a favorable separation is a high dry-weight distribution ratio, $D_w$, of the chemical component of greatest interest, and a low $D_w$ for other species present. The distribution ratio is proportional to the retention of a chemical species on a chromatographic column resin bed. The distribution ratio is calculated using Equation 1, where $A_0$ is the total activity of the solution loaded onto the resin, $A_s$ is the activity of the solution withdrawn from the resin after mixing, w is the mass (in grams) of resin, and V is the total volume (in mL) of solution mixed with resin. The $A_0$ and the $A_s$ values should take into consideration any background activity present in the prepared acid solutions.

$$D_w = \frac{\frac{A_0 - A_s}{w}}{\frac{A_s}{V}} \qquad \text{Equation 1)}$$

Table 1 shows that the distribution ratio for $^{46}$Sc increases with the acidity of the $H_2SO_4$ solutions over the 2-6 M concentration range with a maximum value of 48,466.5 mL/g in 6 M $H_2SO_4$ and an average activity of 2 cpm. The activity of a 100 μL aliquot of the scandium stock solution in 1 mL of deionized water was determined to be 670±2 cpm. The filtration system experienced approximately 10% retention of the total activity, determined by calculating the percent difference between the filtered laboratory control solution and the unfiltered stock solution aliquot in deionized water.

TABLE 1

$^{46}$Sc, $^{88}$Y, and $^{nat}$Ti $D_w$ on resin in $H_2SO_4$ systems

| [$H_2SO_4$] (M) | $^{46}$Sc $D_w\left(\frac{mL}{g}\right)$ | $^{88}$Y $D_w\left(\frac{mL}{g}\right)$ | $^{nat}$Ti $D_w\left(\frac{mL}{g}\right)$ |
|---|---|---|---|
| 2.035 | 18.7 | 76.8 | 0.5 |
| 3.031 | 490.7 | 3913.5 | 0.3 |
| 3.995 | 6,590.8 | >10,000 | 0.1 |
| 4.964 | >10,000 | >10,000 | 0.2 |
| 5.951 | >10,000 | >10,000 | 0.8 |
| 7.871 | >10,000 | >10,000 | 0.4 |

Figure 2:
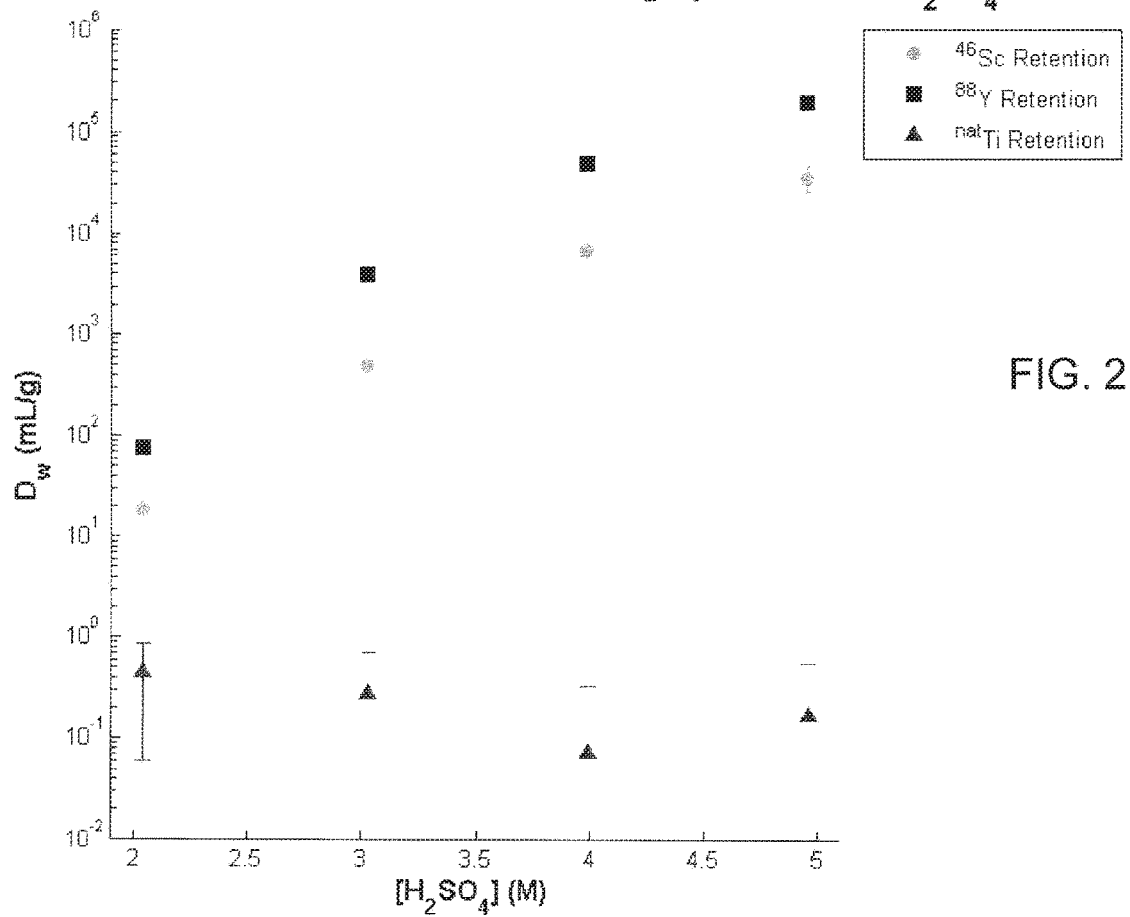
FIG. 2 is a graph showing the affinity of select isotopes for resin in sulfuric acid, in accordance with features of the present invention.

FIG. 2 demonstrates the affinity of $^{46}$Sc and its homolog, $^{88}$Y, for the resin in $H_2SO_4$ while titanium is not retained.

Surprisingly and unexpectedly, the inventors found that temperature had relatively no effect on resin performance or isotope yield, particularly in the continuous production protocol. As such, generally, the invention can be conducted at between approximately 15° C. and approximately 100° C.

As noted supra, a myriad of radiation sources are available to generate the target radioisotopes. A preferred route is via a LINAC. The following is one such protocol:

A "clam shell" target station was attached at the end of a beam line of the Argonne National Laboratory 50 MeV/30 kW electron LINAC. A water cooled tungsten convertor was used to convert the incident electrons to photons. The convertor consisted of three tungsten disks 0.08" thick and spaced 0.04" apart. Two natural Ti foils (2"×4"×0.035" 99.7%) and 10 g of natural $TiO_2$ (Sigma Aldrich, >99% A.C.S. grade, ~2"×2"×0.125") were irradiated using this target station. The Ti foils were placed ~0.1875" and 0.625" behind the convertor. The foils were cooled with compressed air forced through a coil submerged in ice water. The $TiO_2$ was ~1.375" from the convertor and was in contact with a water-cooled plate. The foils were wrapped in high-grade aluminum foil for containment and the $TiO_2$ was doubly wrapped with the same foil.

The three targets were irradiated with an electron beam energy of 35 MeV at 2 kW and a frequency of 22 Hz providing an average current of 56 μA. The beam was on target for three hours. All samples were counted with an HPGe detector (Table 1) after retrieval the following day. The titanium plates were scanned by a gamma scanner to verify the beam position and size. The $TiO_2$ target was portioned and dissolved, pursuant to the protocol disclosed supra.

In summary, a 50 MeV/30 kW electron LINAC was suitable for production of scandium in useful quantities. The yield is expected to increase linearly with increased power and irradiation time. These experiments confirmed the production of all expected radioscandium radioisotopes from a natural $TiO_2$ target.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for isolating radioactive isotope, the method comprising:
   a. dissolving irradiated targets in sulfuric acid and sulfate salt to create a solution containing the isotopes;
   b. contacting the solution with a resin so as to adsorb the isotopes on the resin and generate an eluent containing titanium;
   c. contacting the isotopes-containing resin with acid of a first concentration to remove impurities from the resin; and
   d. contacting the isotopes-containing resin with an acid of a second concentration to remove the isotopes from the resin.

2. The method as recited in claim 1 wherein the resin comprises normal diglycolamides or branched diglycolamides.

3. The method as recited in claim 1 wherein the first concentration is higher than the second concentration.

4. The method as recited in claim 1 wherein the sulfuric acid is mixed with the sulfate salt such that the solution has a total sulfate concentration of between 2 and 10 M.

5. The method as recited in claim 1 wherein the concentration of sulfate salt is between 0 and 2.5 M.

6. The method as recited in claim 1 wherein a single resin bed is used.

7. The method as recited in claim 1 wherein the removed isotope is subjected to filtration.

8. The method as recited in claim 1 wherein the isotope has a purity value of greater than 95 percent.

9. The method as recited in claim 1 wherein the salt has a cation selected from the group consisting of ammonium, sodium, potassium, rubidium, cesium, and combinations thereof.

10. The method as recited in claim 1 wherein the targets are first subjected to radiation.

11. The method as recited in claim 10 wherein the radiation is an ionizing radiation source selected from the group consisting of a linear accelerator, a nuclear reactor, cyclotrons, or combinations thereof.

12. The method as recited in claim 1 wherein the resin is regenerated with sulfuric acid after the isotopes are removed.

13. The method as recited in claim 1 wherein the dissolving step utilizes sulfuric acid with sulfate ions and the resin comprises diglycolamide.

14. The method as recited in claim 1 wherein the acid of a first concentration is a mineral acid selected from the group consisting of nitric acid, hydrochloric acid and combinations thereof.

15. The method as recited in claim 1 wherein the targets are first dissolved in sulfuric acid, and then the sulfate salt is added to create the solution.

16. The method as recited in claim 1 wherein ambient, or positive, or negative pressure is applied to the resin.

17. The method as recited in claim 1 wherein the targets comprise[[s]] heterogeneous bulk material.

18. The method as recited in claim 1 wherein the targets comprise homogeneous bulk material.

19. The method as recited in claim 2 wherein residual moieties from the dissolving step catalyzes the adsorption of isotopes onto the resin.

20. The method as recited in claim 19 wherein the isotopes are trivalent cations selected from the group consisting of Y-90, Lu-177, Sm-153, Er-169, Tb-161, Gd-159, Pr-143, Pm-149, Dr-165, Ho-166, Pr-142, Ac-225, and combinations thereof.

* * * * *